July 2, 1940. W. E. SHEARER 2,206,856
TRANSFORMER
Filed May 31, 1938
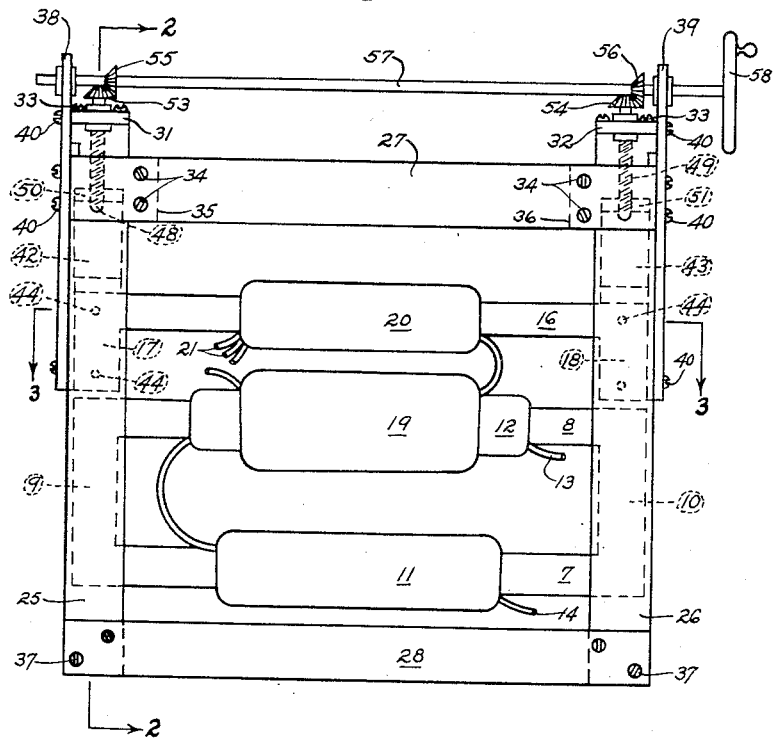
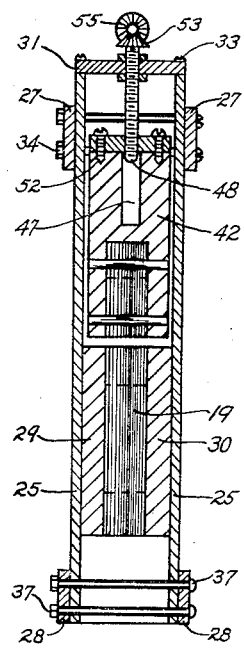
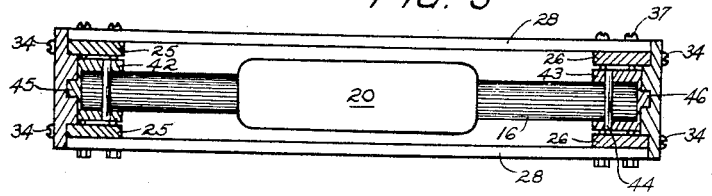
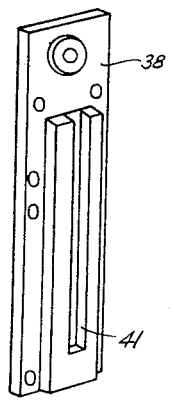
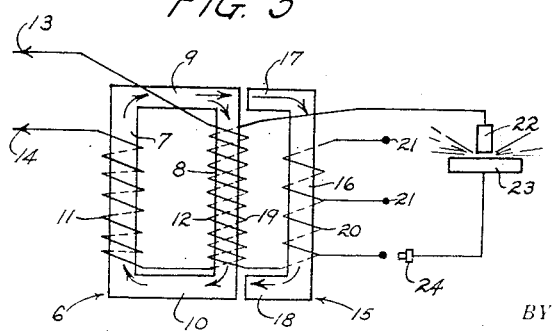
WILLIAM E. SHEARER
INVENTOR
BY Hubert Miller
ATTORNEY Patented July 2, 1940

2,206,856

UNITED STATES PATENT OFFICE 2,206,856

TRANSFORMER

William E. Shearer, Oklahoma City, Okla.

Application May 31, 1938, Serial No. 210,831

7 Claims. (Cl. 171—119)

This invention relates to a transformer for use in arc welding systems wherein alternating current is used at the welding arc.

Various previously issued patents have pointed out and specifically explained the advantages of such a system over direct current arc systems.

All recent improvements in alternating current arc systems have attempted to obviate the previously existing faults of such systems, namely: the instability of the arc, waste in power consumption, because of the previous necessity of using inductances and resistances, the comparatively high open circuit voltage and its consequent danger to the operator, lack of quick current and/or voltage adjustment, and lack of sufficiently wide heat energy range at the arc without comparatively high open circuit voltage. Since these recent attempts have not been successful in eliminating the above mentioned faults, it is the object of my invention to do so.

Under test my system will do the heaviest of welding jobs perfectly with an open circuit voltage of only 60 to 65 volts, which practically removes the danger of injury to the operator (systems in general use today vary from 50 to 80 volts, low phase, and from 70 to 110 volts, high phase); operating on a somewhat lower open circuit voltage, the arc can be struck with ease even on the lowest heats, and thereafter remains more stable than in systems using a considerably higher open circuit voltage; my system makes it possible to weld overhead with the electrodes in vertical position, even though a great deal of the heat is lost quickly during such an operation; it is much safer than systems now in use because of the extremely low open circuit voltage used; my system makes it possible to weld on a much lower current without the arc flickering or flashing out as it does when the current is reduced in machines of present design; because of this last mentioned characteristic it is possible, when using my system, to weld #22 gauge metal plates, which is not to my knowledge possible with any alternating current system now in general use; it is more economical to build because it requires less iron and less copper than systems now on the market (my system requires only half as many turns in the control winding as is required to give the proper heat range in the better systems now on the market); it develops less magnetic drag between the secondary and control windings, assuming the same welding current is being used, than any other system within my knowledge; its voltage and current are automatically inversely varied to insure the delivery of a substantially constant rate of heat energy at the arc, while in addition, a manual control is provided to cover a wide range of voltage and current regulation.

The details in the construction of a preferred form of my invention, together with other objects attending its production, will be better understood from the following description when read in connection with the accompanying drawing, which is chosen for illustrative purposes only, and in which Figure 1 is a side elevation of a preferred form of my transforming device showing particularly one type of mounting and manual control means;

Figure 2 is a sectional view taken along the line 2—2 of Figure 1 and shows further details of the type control means preferred;

Figure 3 is a sectional view taken along the line 3—3 of Figure 1;

Figure 4 is a perspective view of a portion of the device illustrated in Figs. 1, 2 and 3; and Figure 5 is a diagrammatic view showing the windings, etc., which are shown in assembled working relation in Figure 1.

Like characters of reference designate like parts in all the figures.

Referring particularly to Figure 5, numeral 6 designates a substantially rectangular closed circuit type laminated core with legs 7 and 8 joined by the portions 9 and 10. The leg 7 carries a portion 11 of a primary winding, while the leg 8 carries another portion 12 of the primary winding, the two portions being reversely wound, and their terminal ends, 13 and 14, being connected to a source of alternating current.

Arranged in proximity to one leg of the core 6, is a substantially U-shaped open circuit type laminated control core 15, having a leg 16 arranged substantially parallel to the legs 7 and 8 of the core 6, and having right angled projecting portions 17 and 18 which are respectively in substantial alignment with the portions 9 and 10. This control core 15 is mounted for movement toward and away from the core 6, in any suitable manner. One means of mounting is illustrated in Figure 1 and will be hereinafter described.

Continuing the description with particular reference to Figure 5, a portion 19 of a secondary winding is also arranged on the leg 8, and is wound about this leg in the same direction as is the portion 12 of the primary winding. The primary and secondary windings on this leg 8 may be divided into spaced sections with air spaces between them in a manner which will be clearly understood by those familiar with this art; or the primary may be wound over the secondary, or vice versa, since I have proven by test that the results produced are practically the same. An auxiliary secondary winding 20 is arranged on the leg 16, the direction of winding being opposite to the direction in which the main secondary 19 is wound on the leg 8. This auxiliary secondary winding 20 is provided with a plurality of taps 21, which are adapted to be connected either to the movable electrode 22, or to the work to be welded 23, by a suitable jack 24. The opposite end of the secondary is, of course, connected to the other electrode.

It will be noted that an air gap is left between the opposite ends of the leg 8 and the respective adjacent ends of the projections 17 and 18. I consider this an important feature of my invention as these gaps increase the inherent reactance of the transformer, and aid very materially in stabilizing the arc. The ability to move the core 15 away from the core 6, coupled with the optional use of the taps 21 make a very fine adjustment possible, and so increase the range of voltage and current control, that a separate impedance or reactance is entirely unnecessary with my system. Also this arrangement eliminates the necessity of a separate flux diverter, as is commonly required in systems in general use today.

Another very important feature in this invention is the direction of the winding of the primary and secondary windings. With the windings wound as described, a desired secondary power (approximately equal to the product of the volts and amperes) is automatically maintained because the voltage of the secondary varies instantaneously to counteract any sudden drop, regardless of the cause of the drop or drainage, and the result is a substantially constant heating power at the arc during the welding operation. My explanation for this instantaneous counteracting build up in voltage is the manner in which my particular combination of cores and windings automatically govern the magnetic flux. In the first place I have shortened the magnetic circuit. During the welding operation the flow of current induces a secondary flux in leg 16 of such polarity as to draw a part of the primary flux through that leg and to consequently lower the magnetic flux in leg 8, thereby reducing the voltage across the main secondary winding 19. In case of a sudden drop in the current and induced flux in the leg 16, a large part of the primary flux resumes its travel through the leg 8, instantaneously building up the voltage in the main secondary 19, which build up produces a surge of current which rushes in, induces a flux in that portion of the control core 16 which had been drained, and reestablishes the welding arc heat, thus automatically stabilizing the arc to its predetermined or set value; and this is true even though the core 15 is spaced some distance from the core 6, and when the welding operation is being carried on at the lowest heat.

Having described the construction and operation of my welding circuit, I will now describe a preferred type mounting for the cores, coils, etc., which make up the circuit, and their manner of assembly.

Referring to Figures 1, 2, and 3 the numerals 25 and 26 designate complemental side frame members, and the numerals 27 and 28 designate complemental end frame members, all of which are of non-conductive material, preferably wood. A duplicate set of these complemental members are provided to form the other side of the frame. A pair of wedges, 29 and 30, of non-conductive material are provided for each of the portions 9 and 10 of the core 6, and serve to firmly support the core between the two frame members 25 and the two frame members 26, as clearly shown in Figure 2. The upper ends of the two sides of the frame are held in spaced relation by means of bearing blocks 31 and 32, screws 33 screwed into the ends of the members 25 and 26, and by bolts 34, which bolts pass through an offset projection integral with the members 25 and 26, as shown by the dotted lines 35 and 36 in Figure 1. The lower ends of the two sides of the frame are adjustably clamped together by bolts 37. When the nuts are tightened on these bolts, the two lower corners of the frame are drawn firmly together and the wedges 29 and 30 tightly impinge the portions 9 and 10 of the core 6 between them.

Additional bearing members 38 and 39 are attached one to each edge of the frame by means of screws 40, as shown in Figure 1. A detail of these blocks is shown in Figure 4, and from this figure it will be seen that their inner surfaces are grooved, as indicated by numeral 41, and the lower end of these grooves serve to limit the movement of the core 15 toward the core 6.

The manner of mounting the core 15 will now be described. The end portions 17 and 18 are each partially enclosed within the bifurcated lower ends of similar slide blocks 42 and 43, and are preferably held therein by means of wooden pins 44. The outside edge of each of these blocks includes a longitudinally extending tongue which slidably fits in the respective grooves of the blocks 38 and 39. These tongues are designated by the numerals 45 and 46. At its upper end each of the blocks 42 and 43 is centrally bored, as indicated by the numeral 47, to afford longitudinal movement for screws 48 and 49, which threadedly engage caps 50 and 51, each of these caps being rigidly and firmly secured by means of screws 52 to the upper end of the respective blocks 42 and 43.

Near their upper ends the screws 48 and 49 are journaled in the bearing blocks 31 and 32, and the extreme upper ends of these screws are fitted respectively with bevel gears 53 and 54, which respectively mesh with bevel gears 55 and 56 carried by a rod 57 which is journaled near each of its ends in the bearing members 38 and 39. One end of this rod 57 is fitted with a hand wheel 58.

With this arrangement it will easily be seen that the turning of the hand wheel 58 in one direction will positively move the core 15 toward the core 6, while movement of the wheel in the opposite direction will positively move the core 15 away from the core 6. When the lower ends of the tongues 45 and 46 reach the lower ends of their respective grooves 41, the movement of the core is stopped, and the length of these grooves 41 is such as to maintain the two air gaps previously mentioned between the two cores.

While I have not illustrated a housing for the structure thus described, it is of course contemplated that suitable housing may be used, in which case suitable terminal connections would be provided for the terminal ends 13 and 14, and for the taps 21, in the wall of the housing.

While I have described and illustrated a specific embodiment of the invention I am aware that numerous alterations and changes may be made therein without transcending the inventive idea and I do not wish to be limited except by

I claim:

1. Apparatus for metallic arc cutting and welding including a transformer having a closed circuit core; a portion of a primary winding on each of the two end legs of said core; an adjustable open circuit control core adjacent but spaced slightly away from one end leg of said first mentioned core; an auxiliary secondary winding on said control core; and a main secondary winding on the adjacent end leg of the closed circuit core.

2. Apparatus for metallic arc cutting and welding including a transformer having a closed circuit core with a plurality of parallel cross legs; a portion of a primary winding on each of said parallel cross legs; a movable substantially U-shaped open circuit control core mounted adjacent but spaced slightly away from one end of one of said parallel cross legs; an auxiliary secondary winding on said control core; and a main secondary winding on the adjacent end cross leg of the closed circuit core.

3. Apparatus for metallic arc cutting and welding including a transformer having a closed circuit core, said core having two parallel main legs; a portion of a primary winding on each of said main legs, the two portions being wound in opposite directions; an open circuit control core with its two ends adjacent but spaced slightly away from one main leg of said closed circuit core; a portion of a secondary winding on said control core; and another portion of the secondary winding on one adjacent main leg of the closed circuit core; the last mentioned portion of the secondary winding being wound in the same direction as that portion of the primary winding on the same leg, and the first mentioned portion of the secondary winding being wound in the opposite direction.

4. Apparatus for metallic arc cutting and welding including a transformer having a closed circuit core; a portion of a primary winding on each of the two end legs of said core; an open circuit control core adjacent but spaced slightly away from one end leg of said first mentioned core; a portion of a secondary winding on said control core; another portion of the secondary winding on the adjacent end leg of the closed circuit core; and taps in the control core winding for varying the effective number of turns used.

5. Apparatus for metallic arc cutting and welding including a transformer having a closed circuit core; a portion of a primary winding on each of the two end legs of said core, the two portions being wound in opposite directions; a non-conductive frame for rigidly supporting said core; an open circuit control core movably mounted in said frame adjacent one end leg of said first mentioned core; a portion of a secondary winding on said control core; and another portion of the secondary winding on the adjacent end leg of said closed circuit core, the two portions of the secondary winding being wound in opposite directions.

6. Apparatus for metallic arc cutting and welding including a transformer having a closed circuit core with a portion of a primary winding wound on each of its two end legs in opposite directions; an open circuit core; a secondary winding, one portion of which is wound around one end leg of said closed circuit core in the same direction as the primary winding on that leg, and one portion of which is wound on said open circuit core in the opposite direction, said open circuit core secondary winding adapted to induce a portion of the primary magnetic flux to flow through said open circuit core, thus reducing the amount of primary flux flowing through said closed circuit core during the welding operation; and said closed circuit core secondary winding in association with a portion of said primary winding adapted to instantly counteract and restore to normal any sudden change in the induced voltage.

7. A transformer comprising a main primary and an auxiliary primary winding spaced apart and parallel; and a secondary winding embodying a main coil wound over the main primary and an auxiliary control coil parallel to, adjacent, and adjustable with relation to its spacing from the main primary and main secondary.

WILLIAM E. SHEARER.